*(12)* United States Patent
Muskal et al.

(10) Patent No.: US 9,311,402 B2
(45) Date of Patent: Apr. 12, 2016

(54) SYSTEM AND METHOD FOR INVOKING FUNCTIONALITIES USING CONTEXTUAL RELATIONS

(75) Inventors: Tal Muskal, Tel-Aviv (IL); Tal Keinan, Tel-Aviv (IL)

(73) Assignee: SemantiNet Ltd., Shefayim (IL)

( * ) Notice: Subject to any disclaimer, the term of this patent is extended or adjusted under 35 U.S.C. 154(b) by 353 days.

(21) Appl. No.: 12/809,592

(22) PCT Filed: Apr. 6, 2008

(86) PCT No.: PCT/IL2008/000470
§ 371 (c)(1),
(2), (4) Date: Jun. 20, 2010

(87) PCT Pub. No.: WO2009/081393
PCT Pub. Date: Jul. 2, 2009

(65) Prior Publication Data
US 2010/0274804 A1    Oct. 28, 2010

Related U.S. Application Data

(60) Provisional application No. 61/008,570, filed on Dec. 21, 2007.

(51) Int. Cl.
*G06F 17/30*    (2006.01)
(52) U.S. Cl.
CPC .............................. *G06F 17/30864* (2013.01)
(58) Field of Classification Search
CPC .................................................. G06F 17/30864
USPC ........................................................ 707/769
See application file for complete search history.

(56) References Cited

U.S. PATENT DOCUMENTS

| | | | |
|---|---|---|---|
| 6,560,595 B1 * | 5/2003 | Sanders et al. | |
| 6,584,469 B1 * | 6/2003 | Chiang et al. | |
| 7,304,478 B2 * | 12/2007 | Tsuda ................ | G01R 33/3815 324/322 |
| 7,603,349 B1 * | 10/2009 | Kraft et al. | |

(Continued)

FOREIGN PATENT DOCUMENTS

WO    WO 2009/081393    7/2009

OTHER PUBLICATIONS

International Search Report Dated Nov. 10, 2008 From the International Searching Authority Re.: Application No. PCT/IL08/00470.

(Continued)

*Primary Examiner* — Sherief Badawi
*Assistant Examiner* — Sabana S Rahman

(57) ABSTRACT

A method for obtaining contextually related instances. The method comprises providing a map of a plurality of contextual relations between a plurality of instance types and a plurality of functionalities. Each one of the functionalities is associated with one of the mapped contextual relations and configured for providing one or more instances of a respective type. The method further comprises receiving a contextual linkage between a known instance and a requested instance, identifying a match between the contextual linkage and a segment of the map, and obtaining the requested instance by using the known instance along with a group of which is selected from the functionalities; each member of the group is associated with a contextual relation in the segment.

32 Claims, 10 Drawing Sheets
(4 of 10 Drawing Sheet(s) Filed in Color)

(56) References Cited

U.S. PATENT DOCUMENTS

| | | | |
|---|---|---|---|
| 8,572,059 B2 * | 10/2013 | Britton | G06F 19/345 707/705 |
| 8,812,452 B1 * | 8/2014 | Hushon | G06F 17/30448 707/661 |
| 2005/0216300 A1 * | 9/2005 | Appelman et al. | 705/1 |
| 2006/0184473 A1 | 8/2006 | Eder | |
| 2006/0248093 A1 * | 11/2006 | Lassila | G06F 17/30864 |
| 2007/0094042 A1 | 4/2007 | Ramer et al. | |
| 2007/0156669 A1 * | 7/2007 | Marchisio et al. | 707/4 |
| 2007/0156677 A1 | 7/2007 | Szabo | |
| 2008/0120411 A1 * | 5/2008 | Eberle | 709/225 |
| 2008/0133658 A1 * | 6/2008 | Pennington | 709/204 |
| 2008/0214152 A1 * | 9/2008 | Ramer et al. | 455/414.1 |
| 2008/0270339 A1 * | 10/2008 | Copeland | G06F 17/30507 706/50 |
| 2009/0070435 A1 * | 3/2009 | Abhyanker | 709/218 |
| 2009/0106234 A1 * | 4/2009 | Siedlecki | G06F 17/30864 |
| 2009/0164949 A1 * | 6/2009 | Henkin et al. | 715/862 |
| 2010/0106599 A1 * | 4/2010 | Kohn et al. | 705/14.54 |
| 2011/0035391 A1 * | 2/2011 | Werner | G06F 17/30569 707/756 |

OTHER PUBLICATIONS

Written Opinion Dated Nov. 10, 2008 From the International Searching Authority Re.: Application No. PCT/IL08/00470.

International Preliminary Report on Patentability Dated Jul. 1, 2010 From the International Bureau of WIPO Re. Application No. PCT/IL2008/000470.

* cited by examiner

SYSTEM AND METHOD FOR INVOKING FUNCTIONALITIES USING CONTEXTUAL RELATIONS

RELATED APPLICATIONS

This Application is a National Phase of PCT Patent Application No. PCT/IL2008/000470 having International filing date of Apr. 6, 2008, which claims the benefit of U.S. Provisional Patent Application No. 61/008,570 filed on Dec. 21, 2007. The contents of the above Applications are all incorporated herein by reference.

FIELD AND BACKGROUND OF THE INVENTION

The present invention, in some embodiments thereof, relates to a system and a method for contextual search and, more particularly, but not exclusively, to a system and a method for discovering data according to contextual relation.

The emergence of the information age has created a wealth of information that is available electronically. Unfortunately, much of this information is often inaccessible to individuals and data mining systems because they do not know where to look for it or if they do know where to look, the information may not be found efficiently, inter alia because of the large amounts of information and/or because they do not know when is the right moment to look.

One common technique, implemented by traditional keyword search engines, matches words expected to found in a set of documents through pattern matching techniques. Thus, the more that is known in advance about the documents including their content, format, layout, etc., the better the search terms that may be provided to elicit a more accurate result. Data is searched and results are generated based on matching one or more words or terms that are designated as a query. Results such as documents are returned when they contain a word or term that matches all or a portion of one or more keywords that were submitted to the search engine as the query. Some keyword search engines additionally support the use of modifiers, operators, or a control language that specifies how the keywords should be combined when performing a search. For example, a query might specify a date filter to be used to filter the returned results. In many traditional keyword search engines, the results are returned ordered, based on the number of matches found within the data. For example, a keyword search against Internet websites typically returns a list of sites that contain one or more of the submitted keywords, with the sites with the most matches appearing at the top of the list. Accuracy of search results in these systems is thus presumed to be associated with frequency of occurrence.

During the last years, a number of systems and methods which are based on contextual and semantic maps have been developed. For example, U.S. Patent Application No. 2007/0260598 published on Nov. 8, 2007, provides search engine methods and systems for generating highly personalized and relevant search results based on the context of a user's search constraint and user characteristics. In an embodiment, upon receipt of a user's search constraint, the method determines all semantic variations for each word within the user search constraint. Additionally, topics may be determined within the user constraint. For each unique word and topic within the user search constraint, possible contexts are determined. A matrix of feasible context scenarios is established. Each context scenario is ranked to determine the most likely context scenario for which the user search constraint relates based on user characteristics. In one embodiment, the weighting used to rank the contexts is based on previous user searches and/or knowledge of their interests. Search results associated with the highest ranking context are provided to the user, along with topics associated with lower ranked contexts.

Another example is provided in U.S. Patent Application No. 2007/0156669 published on Jul. 5, 2007 that describes methods and systems for extending keyword searching techniques to syntactically and semantically annotated data are provided. Example embodiments provide a syntactic query engine ("SQE") that parses, indexes, and stores a data set as an enhanced document index with document terms as well as information pertaining to the grammatical roles of the terms and ontological and other semantic information. In one embodiment, the enhanced document index is a form of term-clause index that indexes terms and syntactic and semantic annotations at the clause level. The enhanced document index permits the use of a traditional keyword search engine to process relationship queries as well as to process standard document level keyword searches.

SUMMARY OF THE INVENTION

According to some embodiments of the present invention there is provided a method for obtaining contextually related instances. The method comprises providing a plurality of functionalities and a map of a plurality of contextual relations among a plurality of instance types, each the functionally being associated with at least one of the plurality of contextual relations and configured for providing at least one instance of a respective type, receiving a contextual linkage between at least one known instance and at least one requested instance, identifying a match between the contextual linkage and a segment of the map, the segment being associated with a group of the plurality of functionalities, and executing the group with the at least one known instance for obtaining the at least one requested instance.

Optionally, the receiving comprises receiving a search query comprising the contextual linkage.

Optionally, the map is a contextual relation graph and the segment being a sub-graph thereof, further comprises converting the contextual linkage to a graph before the matching.

More optionally, the sub-graph is an ordered graph comprising a plurality of segments; the obtaining comprises executing each member of the group according to the order in the ordered graph.

Optionally, the obtaining comprises obtaining at least one intermediate instance, the executing comprising executing a member of the group with at least one intermediate instance for obtaining the at least one requested instance.

Optionally, the at least one known instance appears in a document, further comprising selecting the contextual linkage according to at least on member selected from a group consisting of: the document, a profile of a user accessing the document and a browsing history related to the document.

More optionally, the document is selected from a group consisting of a webpage, a website, a database record, a screen display.

Optionally, each the contextual relation describes at least one of a social relation, a characterizing relation, an ownership relation, a property relation, and an identifying relation.

Optionally, at least one of the plurality of contextual relations defines at least one constrain, the executing comprises verifying the at least one known instance comply with the constrain.

Optionally, the contextual linkage comprises a group of the plurality of contextual relations.

More optionally, the obtaining comprises executing a first of the group for obtaining at least one intermediate instance and executing the at least one intermediate instance along a second of the group for obtaining the at least one requested instance.

More optionally, the method further comprises outputting an answer graph depicting a contextual relationship of at least one of the at least one intermediate instance and the at least one requested instance.

Optionally, at least one of the plurality of contextual relations is a conditional contextual relation defining at least one required instance.

More optionally, at least one of the plurality of functionalities is configured for using the at least one required instance for obtaining the at least one requested instance.

More optionally, at least one of the plurality of contextual relations defines an inherence relation between one of the plurality of instance types to another of the plurality of instance types.

Optionally, the obtaining comprises using at least one of the plurality of functionalities for providing a member selected from a group consisting of an advertisement, a rich site summary (RSS), a media file, a link to a contextually related content, and a website; wherein the member is contextually related to the at least one known instance.

Optionally, at least one of the plurality of functionalities is a search module configured for searching at least one instance of an associated the instance type in at least one database.

Optionally, at least one of the plurality of functionalities is a conversion module configured for converting at least one instance of an associated the instance type.

According to some embodiments of the present invention there is provided a system for identifying a contextually related instance. The system comprises a contextual map for mapping a plurality of contextual relations among a plurality of instance types, a list of a plurality of functionalities, each the functionality being associated with at least one of the plurality of contextual relations, an input module configured for receiving a contextual linkage between at least one known instance and at least one requested instance, and a computing module configured for selecting a group of the plurality of functionalities according to a match between the contextual linkage and a segment of the contextual map and obtaining the at least one requested instance by using the group.

Optionally, at least one of the plurality of functionalities is configured for communicating with a network node for the obtaining.

More optionally, the network node is selected from a group consisting of a database, a list, and a web server.

Optionally, at least one of the plurality of functionalities is configured for generating the at least one requested instance according to the at least one known instance.

According to some embodiments of the present invention there is provided a method for obtaining a plurality of contextually related instances. The method comprises: a) providing a map of a plurality of contextual relations among a plurality of instance types and a plurality of functionalities, each the functionality being configured for providing at least one instance of one of the plurality of instance types, b) receiving a known instance of a first of the plurality of instance types, c) using the map for identifying a group of the plurality of instance types, each member of the group being connected to the first instance type by at least one of the plurality of contextual relations, and d) for each member of the group, obtaining at least one contextually related instance using a respective the functionality.

According to some embodiments of the present invention there is provided a method for obtaining a plurality of contextually related instances. The method comprises identifying at least one object of interest of a first instance type in a data resource, providing a query defining a contextual linkage between the first instance type and a second instance type, identifying a match between the contextual linkage and a segment of a map of a plurality of contextual relations among a plurality of instance types, and using the match for acquiring at least one instance of the second instance type.

Optionally, the data resource is selected from a group consisting of a webpage, a screenshot, a word processor document, and a graphic user interface.

Optionally, the object of interest is selected from a group consisting of a word, a parse, a paragraph, a website, a link, a media file, and metadata element.

Optionally, the using comprises selecting at least one of a plurality of functionalities, each the functionality being configured for providing at least one instance of one of the plurality of instance types and using the at least one selected functionality for the acquiring.

Optionally, the data resource is accessed by a browsing user; the formulating is performed according to a user profile of the browsing user.

Optionally, the providing comprises selecting the contextual linkage according to the object of interest.

Optionally, the providing comprises providing a profile of a user accessing the data resource and defining the contextual linkage according to the profile.

More optionally, the data resource is a website; the providing comprises selecting the contextual linkage according to at least one characteristic of the website.

Optionally, the data resource is a website, further comprising enhancing a display of the website with the at least one acquired instance.

More optionally, the at least one acquired instance are displayed in association with the at least one object of interest.

Unless otherwise defined, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic illustration of a system for identifying instances which are contextually related to a given instance, according to some embodiments of the present invention;

FIG. 2 is a flowchart of a method for identifying one or more instances which are contextually related to a known instance, according to some embodiments of the present invention;

FIG. 3 is a schematic illustration of an exemplary contextual map graph depicting a contextual relation between two instance types, according to some embodiments of the present invention;

FIG. 4 is a schematic illustration of a contextual relation that connects between two nodes and an additional contextual relation which is connected to an additional node;

FIG. 5 is a schematic illustration of an exemplary contextual map graph depicting contextual relations and type nodes of a contextual map that maps social networks, according to some embodiments of the present invention;

FIG. 6 is a schematic illustration of a sub-graph that is matched according to an exemplary one-step query, according to some embodiments of the present invention;

FIG. 7 is a schematic illustration of an exemplary sub-graph;

Figure 8:
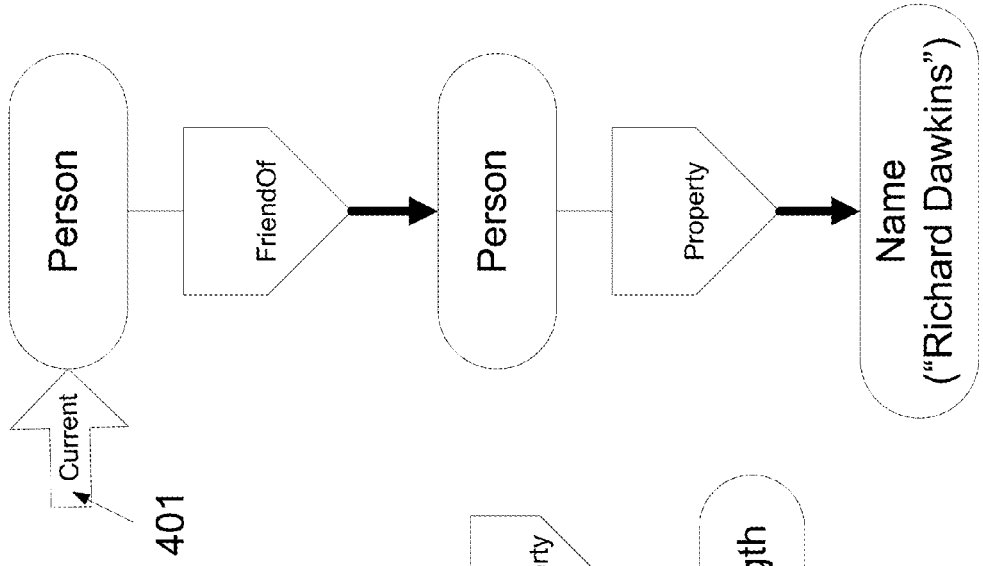
Figure 10:
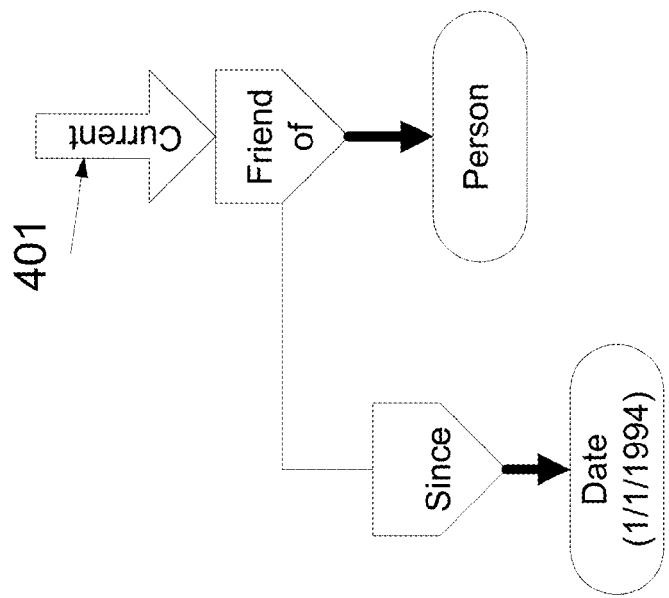
Figure 9:
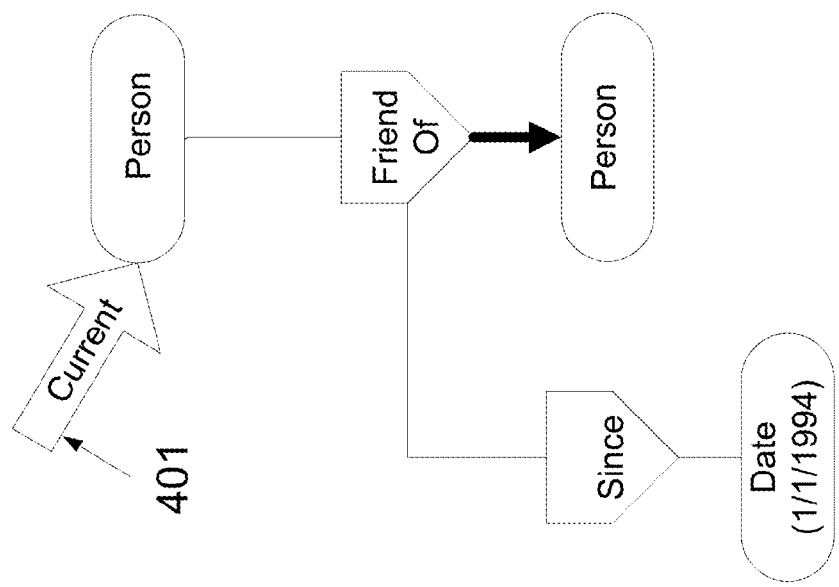
Figure 11:
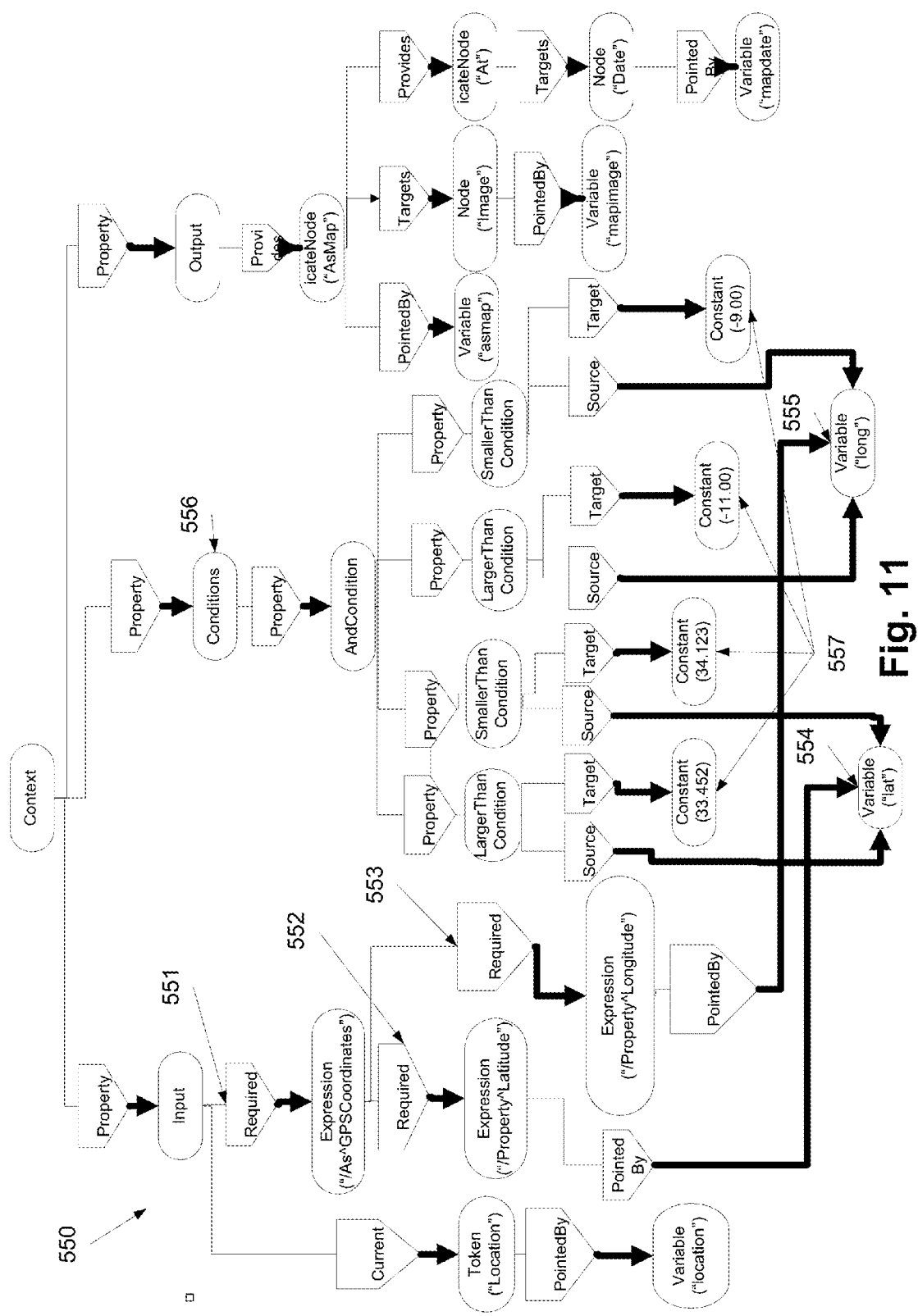
Figure 13:
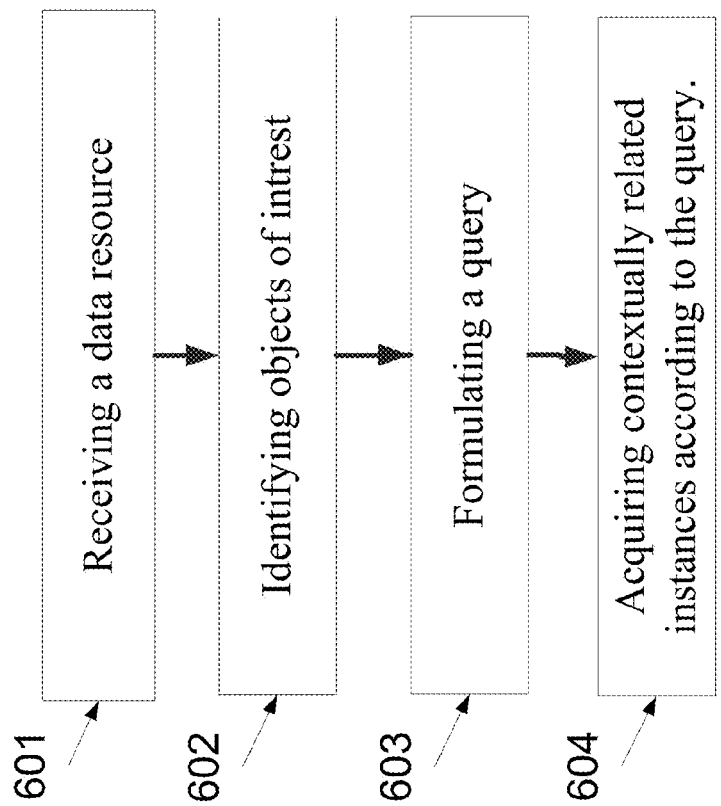
Figure 12:
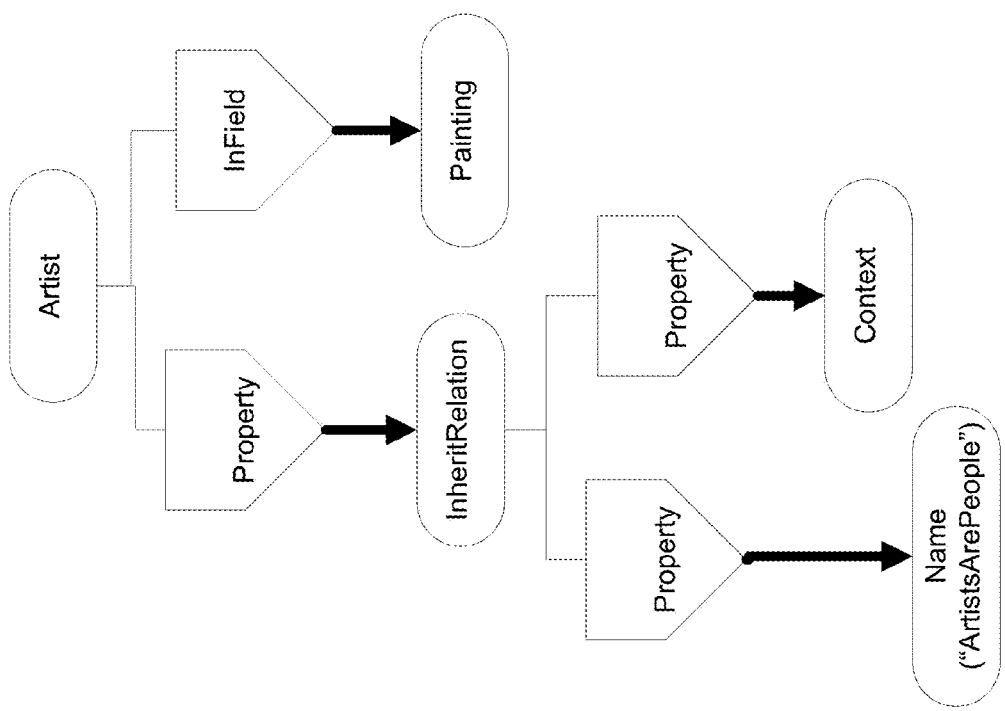

FIGS. 8, 9, and 10 are schematic illustrations of query graphs which are generated according to exemplary multi-step queries, according to some embodiments of the present invention;

FIG. 11 is a schematic illustration of a segment of a contextual map graph that defines, inter alia, a set of constrains, according to some embodiments of the present invention;

FIG. 12 is a schematic illustration of a segment of the contextual map that depicts an inheritance relation between an "artist" type node and a "person" type node, according to some embodiments of the present invention;

FIG. 13 is a schematic illustration a method for enriching a display of a resource of information, such as a webpage or a database record display, according to some embodiments of the present invention; and FIGS. 14-17 are screenshots of an exemplary graphical user interface (GUI) that that is popped of in response to one or more objects of interest in various webpages, according to some embodiments of the present invention.

DESCRIPTION OF SPECIFIC EMBODIMENTS OF THE INVENTION

The present invention, in some embodiments thereof, relates to a system and a method for contextual search and, more particularly, but not exclusively, to a system and a method for discovering data according to contextual relations.

According to some embodiments of the present invention, there is provided a method for obtaining contextually related instances. The method may be used for obtaining contextually related data for search engines, browsing enhancement add-ons, data mining applications, and/or data analysis tools. The method may also be used for obtaining contextually related data from web based applications, business software, location services, mobile services, and/or knowledge management systems. The method is based on a contextual map, such as a graph, that maps contextual relations among instance types and on a list of functionalities that allows the obtaining of instances of a first type that is contextually related in the contextual map to a second type of one or more known instances.

Each one of the contextual relation of the contextual map is associated with one of the functionalities. First, a query that includes a contextual linkage between instance types and a known instance of one of the instance types is received. The query may be defined by a user and/or a computing unit, such as a search engine, a website, and/or a browsing add-on. Optionally, the query is provided via a computer network, such as the Internet, from a remotely located network node. Then, a match is identified between the contextual linkage and a segment of the contextual map. As further described below, the contextual map is optionally a contextual relation graph and the query may be converted to a query graph and matched with a sub-graph of the contextual relation graph. The match allows the obtaining of one or more contextually related instances by executing functionalities which are associated with the segment.

According to some embodiments of the present invention, there is provided a method for obtaining instances which are contextually related to one or more objects of interest, such as words, paragraphs, and/or media files of a data resource, such as a webpage. The method may be implemented using an add-on that is installed on a browser and allows the processing of each downloaded webpage. First, one or more objects of interest of a first instance type are identified in a data resource. These objects of interest may be selected according to characteristics of the webpage, operator definitions, and/or operations of the browsing user. Then, a query that defines a contextual linkage between the first instance type and a second instance type is formulated. Optionally, the data resource is a webpage and the objects of interest are words and/or images thereof. The second instance type may be types of related instances, for example, if the object of interest is a brand of a mobile phone, the second instance types may be a store that sells the mobile phone, a celebrity that owns the mobile phone, a specification of the mobile phone, and/or an image of the mobile phone. In such an embodiment, the query may be formulated according to a profile of a browsing user that accesses the webpage and/or according to the type of the website. For example, the query may be for instances which are contextually related to the fields of interest of the user and/or to characteristics thereof, such as geographic information, profession, age, marital status, and the like. Now, after the query is formulated, a match between the contextual linkage and a segment of a contextual relations map is found. The contextual relations map is optionally defined as outlined above. Then, the match is used for acquiring instances of the second instance type.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
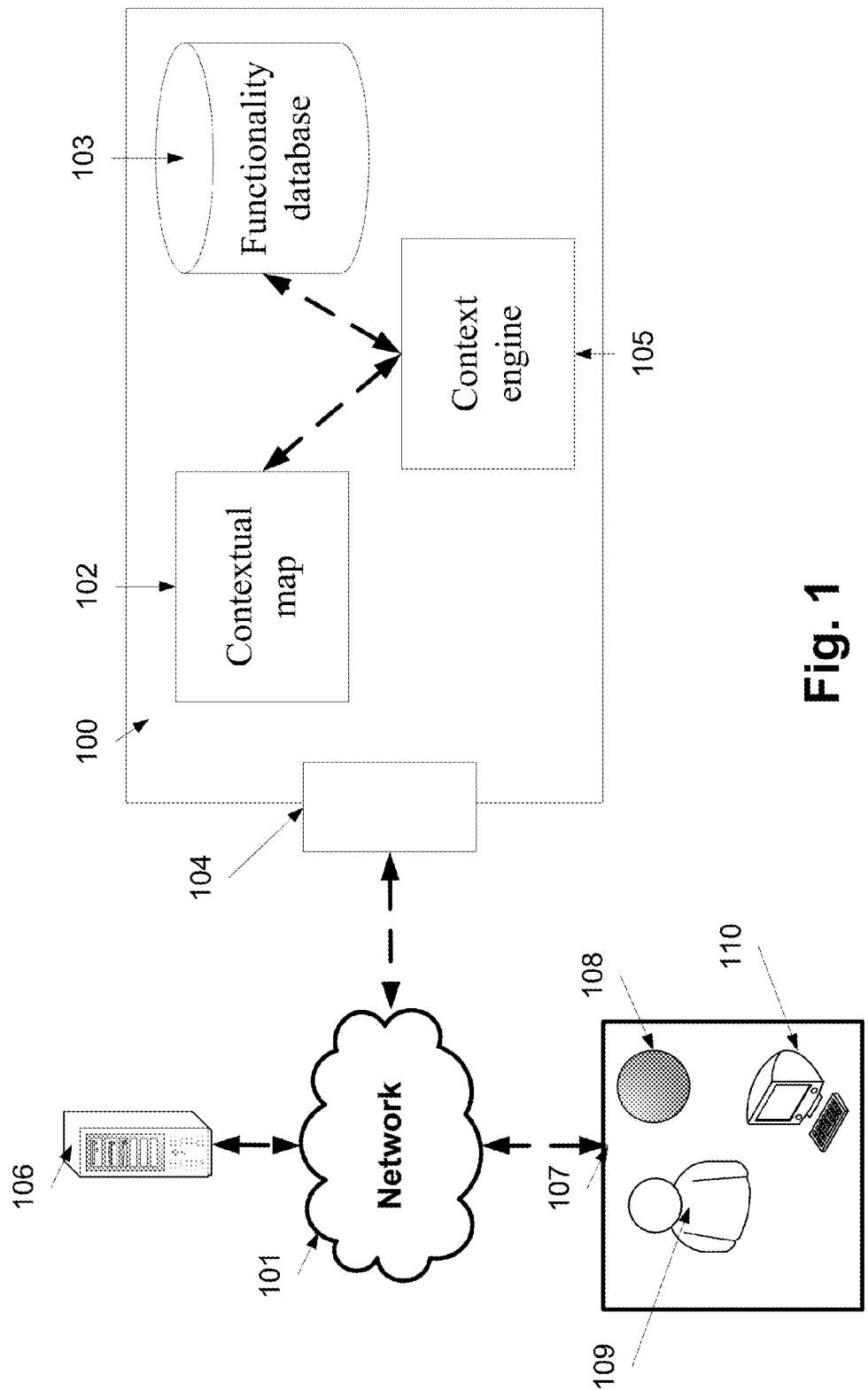

Reference is now made to FIG. 1, which is a schematic illustration of a system for identifying instances which are contextually related to a given instance, according to some embodiments of the present invention. The system 100 optionally identifies one or more instances of a requested instance type that is connected to an instance type by one or more contextual relations of the contextual map. As used herein an instance a reference, such as a mark, a uniform resource locator (URL), a tag, a label, and/or a character string that define an actual object, such as an article, a thing, a title, a property, a characteristic, and a name. As used herein an instance type means a mark, a tag, a label, and/or a character string that may be used to define a group of instances. For example, an instance may be a name such as "Britney Spears", an object, such as "Golf", a property, such as "window", and a characteristic, such as "Blonde" and an instance type may be one of the following types a person, a place, an animal, a movie, a product, a characteristic, a property, prototype for an I think that we should use a different word here instance, or any other classification of an instance.

The system 100, which is optionally implemented by on one or more servers which are connected to a computer network 101, such as the Internet, comprises a contextual data structure 102, such as a contextual map and/or a contextual graph that maps contextual relations that associate among a plurality of instance types and may be referred to herein as a contextual map 102. As used herein, a contextual relation means a simple relation between two instance types that is involving, or depending on a context or a part of a complex relation among a plurality of instance types that is involving, or depending on a set of contexts, for example a conditional contextual relation in which the one contextual relation depends on other contextual relations or on the existence of related instances of other type nodes. For example, a contextual relation may describe a social relation, a characterizing relation, an ownership relation, a property relation, and an identifying relation.

The system 100 further includes a list of a plurality of functionality descriptors 103 which may be referred to herein as a functionality database 103. Each functionality descriptor has an association with a segment of the contextual map 102, optionally as further described below. For example, of the contextual map 102 is a graph, the functionality descriptor has an association with a sub-graph of the graph. Furthermore, each functionality descriptor has a specific binding to a data source and/or service which may be referred to herein as functionality. Each one of the functionalities provides one or more output instances in response to one or more input instances.

The input and the output instances are of one or more of the plurality of instance types which are mapped in the contextual map 102. An example for a functionally may be a search module that is designed for searching instances of a requested type in a certain database, such as a website, according to a received instance of a given type where the given and the requested types are contextually related.

Optionally, a functionality descriptor is associated with a context relation between two instance types, for example between an item and a related property, such as a product-cost relation, a product-description relation, a product-picture relation, and a product-seller identification (ID) relation, etc. Such a functionality descriptor may be described using a simple function in any modern language, such as Microsoft .Net Language. For example, the functionality descriptor may be associated with a search module that is optionally designed to retrieve a description of a movie when it receives a respective title.

In some embodiments of the present invention, the functionality descriptor may be associated with a functionality that is implemented as a web service, such as a representational state transfer (REST) module or a symbolic optimal assembly program (SOAP) module, a module that is designed to execute a database query, such as an structured query language (SQL), a segment in a transformation language that includes a set of instructions for processing a related data, such as a set of graph transformations, an extensible style sheet language transformations (XSLT), a set of text transformations, and/or a set of regular expressions, a script in a language such as Python, Roby, JavaScript, and/or any precompiled executable script that may be used for processing the data, for example a dynamic link library (DLL).

Optionally, each functionality descriptor is a record that includes and/or refers to one or more of the following:
- a field that describes the publisher of a service and/or a data source;
- a testing module for testing the functionality periodically, occasionally, and/or according to an operator intervention;
- a documentation record;
- a list of links to databases and references;
- one or more identification tags; and
- a help file for explaining how to use the functionality.

As described above, each one of the functionalities is defined according to a segment, such as a sub-graph, of the contextual map 102, for example a certain contextual relation that maps a connection between two different instance types. For example, a functionality that is associated with the contextual relation "X is written by Y" where the instance type of X is a book and the instance type of Y is an author or a person, is a search function that is defined to search for an answer in a certain database, such as a website and/or an online knowledge base, such as www.amazon.com.

Optionally, one or more of the functionalities are configured for generating instances of certain type according to one or more known instances. For example, a functionality is defined according to a contextual relation "X dollars worth Y EUROS" where the instance type of X is dollar and the instance type of Y is EURO. The functionality is defined as an exchange function that accesses an online currency exchange services, such as XE.com, com for the answer.

Optionally, one or more of the functionalities are configured for identifying documents which are contextually related to the one or more known instances and/or to a combination thereof. For example, a functionality is defined to retrieve advertisements which are contextually related to a certain consumer good in response to an instance such as a title that depicts a certain product or a certain service, such as antivirus or law services in response to an instance that describes a related need such as virus protection and/or negligence suit. Other documents, such as media files, database records, and/or rich site summary (RSS), which are contextually related to the one or more known instances, may also be retrieved. Optionally, one or more of the functionalities are configured for identifying links to websites which are contextually related to the one or more known instances and/or to a combination thereof.

The system 100 further comprises an input module 104 for receiving a query, such as a line of inquiry or search indicia that include one or more instances of a known type and a request for one or more contextually related instances of a requested type. Optionally, the query defines a contextual linkage between the known type and the requested type. Optionally, the request is received from a requesting entity, such as a network node 106, for example a search engine, a web server, an advertisement server or a system operator, or a client module 108 that in installed on a client terminal 110, such as a personal computer or a mobile phone, optionally as further described below. As used herein a client terminal means a personal computer, a laptop, a mobile device, for example mobile phone and/or a personal digital assistant (PDA), and/or any device that is designed to be connected to the network 101 and operated by a user 109. It should be noted that though only two network nodes 106, 107 are depicted in FIG. 1, the system may be connected to any number of network nodes, for example a plurality of client nodes 107.

The system 100 further includes a computing module 105, which may be referred to herein as a context engine 105, for using the contextual map 102 for identifying one or more functionalities of the functionality database 103 for obtaining the contextually related instances.

Optionally, the context engine 105 converts the received query to a graph, which may be referred to herein as a query graph, according to the aforementioned contextual linkage, and identify a match thereof with a segment of the contextual map 102. Optionally, as further described below, the context engine 105 implements one or more graph reasoning algorithms according to the contextual relations of the segment of the contextual map. Optionally, graph reasoning algorithms combine contextual relations to produce a flexible and/or extensible framework that allows the obtaining of contextually related instances from different sources and/or by using different services.

Optionally, the contextually related instances may be a link and/or a file. Optionally, the link is to an image and/or a video clip that depicts content that is contextually related to the known instances of the query. In such an embodiment, the system 100 may retrieve contextually related images and video clips in response to the query.

Optionally, a contextually related instance may an advertisement and/or a link thereto or a file thereof. Optionally, the content of the advertisement is contextually related to the known instances of the query. In such an embodiment, the system 100 may retrieve contextually related advertisements in response to the query.

Optionally, the contextually related instances may be a rich site summary (RSS) source. Optionally, the RSS source refers to content that is contextually related to the known instances of the query. In such an embodiment, the system 100 may retrieve contextually related RSS sources in response to the query.

As further described below, the query graph maps a number of contextual relations; each may connect between two different types along the contextual linkage. For clarity, every instance that is acquired according to the query graph and is not the given instance or one of the requested contextually related instances may be referred to herein as an intermediate instance. In such cases, the context engine 105 may use one or more of the functionalities for obtaining one or more instances of the intermediate instances. The intermediate instances may be used, with respective functionalities, for allowing the context engine 105 to acquire the requested contextually related instances or more intermediate instances for obtaining the requested contextually related instances. In an optional manner, the system 100 delivers the contextually related instances to the requesting entity 106, optionally automatically, after an iterative process. Optionally, the system 100 further delivers intermediate instances which have been acquired by the context engine 105 during the iterative process.

Optionally, in order to acquire one or more instances, the context engine 105 may search for a relationship between two or more functionalities in the functionality database 103. For example, the context engine 105 may use a currency exchange functionality to convert prices of items which have been acquired using search functionality. As a result, the context engine 105 may acquire a price of a certain product in any requested currency.

Figure 2:
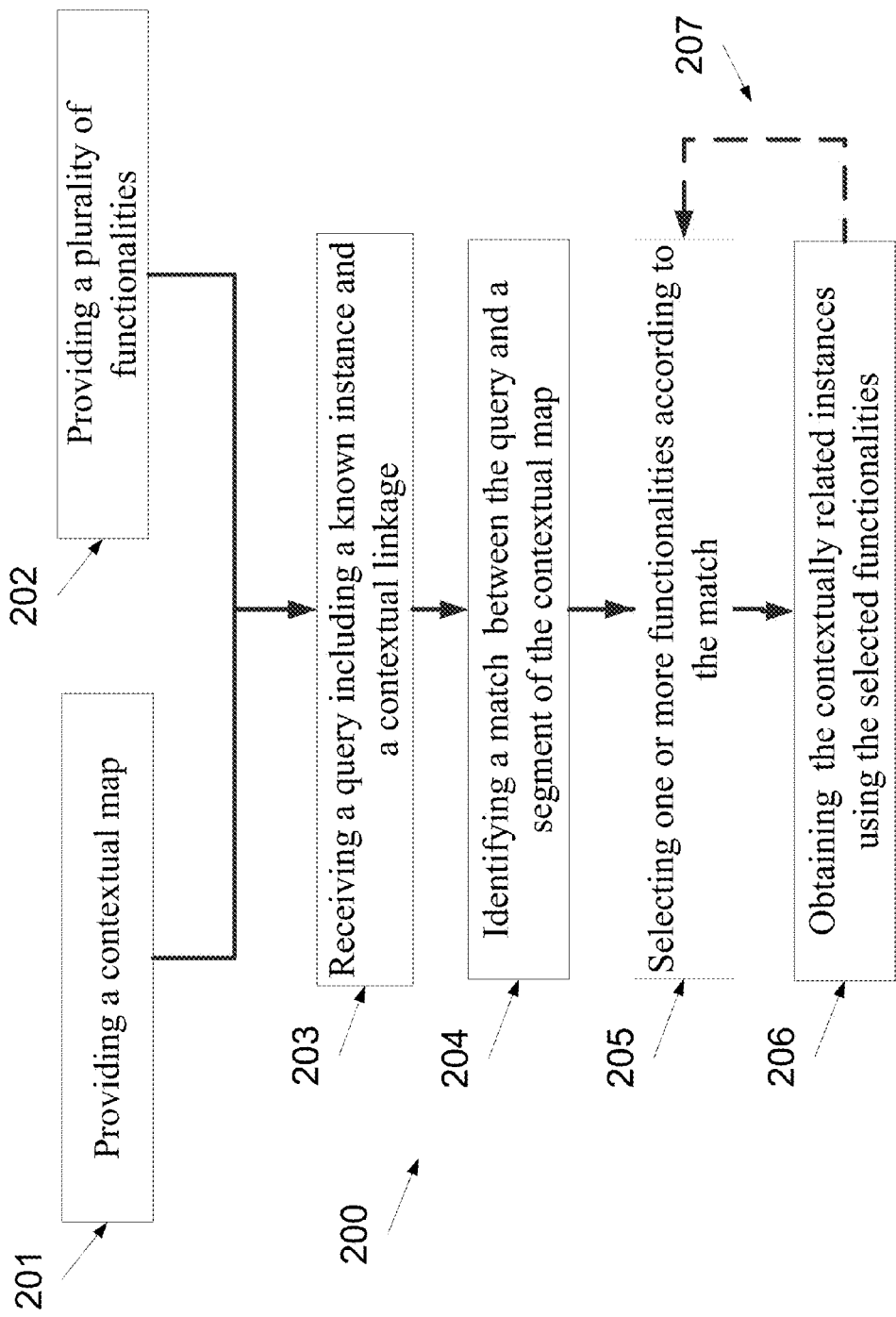

Reference is now also made to FIG. 2, which is a flowchart of a method for identifying one or more instances which are contextually related to a known instance, according to some embodiments of the present invention. The method 200 is optionally used for identifying one or more instances of an instance type which are connected by contextual relations of the map to an instance type of a known instance. First, as shown at 201, a contextual map 102 that maps contextual relations among instance types, such as the aforementioned contextual graph, for example as shown at 102, is provided. Then, as shown at 202, a list that includes a plurality of functionalities, optionally, as shown at 103, is provided. Now, as shown at 203, a query that includes a known instance and a contextual linkage between the instance type of the known instance and an instance type of contextually related instances is received, optionally via the network 101, as shown at 104. Then, as shown at 204, a match between the query and a segment of the contextual map is identified. Optionally, as described above, the contextual map is a graph. In such an embodiment, the query is converted to a query graph and matched with a sub-graph of the contextual map graph. As described above, contextual relations, which are mapped by the contextual map, are associated with functionalities of the functionality database 103. The match allows the identification of a group of functionalities that may be used for obtaining the contextually related instances which are defined in the query, as shown at 205 and 206, optionally as outlined above and described below. Optionally, as shown at 207, some of the identified functionalities are used and/or identified in an iterative process, optionally as further described below. In such an embodiment, a sub-group of functionalities is used for obtaining intermediate instances which are used for obtaining the contextually related instances and/or additional intermediate instances for an additional sub-group of functionalities. For example, a name of a director of a given movie, which is acquired using a first functionality, may be used for obtaining other movies he made using a second functionality that is designed to receive an actor's name and to retrieve a list of movies he made.

Context Map Graph

Figure 3:
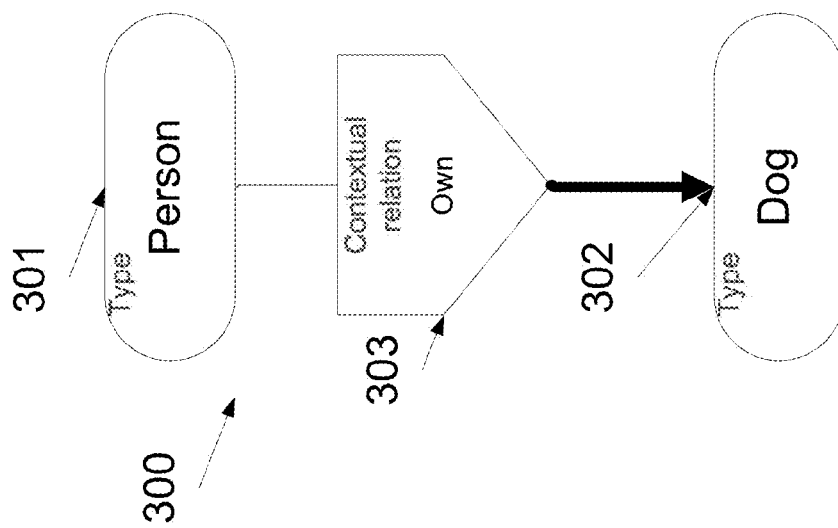

Reference is now made, once again, to FIG. 1 and to FIG. 3, which is a schematic illustration of an exemplary contextual map graph depicting a contextual relation between two instance types. As described above, in some embodiment of the present invention the contextual map 102 is a contextual map graph. The contextual map graph 300, which is optionally a directed graph, includes nodes, as shown at 301, 302 that represent instance types and an edge that connects between the nodes 301, 302, as shown at 303, and represents a contextual relation. For clarity, a node in the graph may be referred to herein as a type node. For example, the contextual map graph 300 of FIG. 3 depicts an ownership contextual relation between a person and a dog. Optionally, each node in the graph is tagged with a unique identification tag, such as a universal resource identifier (URI).

Optionally, the contextual map 102 is an ordered graph in which nodes appear in manner that enables the conversion of between documents, such as extensible markup language (XML) documents, and common language runtime objects and vice versa, for example in an XML serialization.

Optionally, the relative order of every two nodes is stable and therefore not changed during the activity of the context engine 105.

The graph, which is described by the contextual map 102, satisfies one or more of the following constraints:

a type node may be connected to any number of contextual relations, for example 0, 1, 2, 3, 4, 5, 10, 100, 1000, and 10000;

a type node is not directly connected to another type node;

a contextual relation has one and only one outgoing link to a type node; and a contextual relation may link to any number of contextual relations.

Optionally, there is no distinction between a type node or a contextual relation and a graph, which may be referred to herein as a singleton graph, containing only such a node or a contextual relation.

Optionally, a graph contains at least one type node and contextual relations.

Optionally, the type node is data structure that includes the following fields:

Type—an instance type, such as a person, optionally as described above.

URI, possibly empty.

One or more references, such as links to contextual relations, possibly empty. As further described below. The references, which may be represented as a list of links, may list inward and outward links which are related to the type node.

Typed-value—a field, possibly empty, for allowing the filtering results. The field includes a string, a number, and/or a real object, such as a .net object, for example an instance of a windows dialog class. For example, the query?Known^Person[/Property^Name=="John Dow"] fetches all the type nodes with a Type that equals to "Person" and has reference to a contextual relation with a Type="Property" and a reference to a type node with a Type="Name" and a Typed-value="John Dow". Optionally, a contextual relation is a data structure that includes the following fields:

Type—an instance type, such as a property, such as a friend of relation, optionally as described above.

URI, possibly empty.

One or more references, such as links to contextual relations or type nodes, possibly empty.

Optionally, the contextual relation is stored as an intermediate node between two type nodes in the graph. In such an embodiment, the graph comprises edges, which may be referred to herein as links, which serve as connectors between different nodes in the graph. A link optionally includes a pointer to a node and an index that is used for defining an order between two or more sibling nodes of a parent node. The process of adding a link from a node N to a node D consists of adding an inward link pointing to the list of inward links of node D and adding an outward link to the list of outward links of node N.

Figure 4:
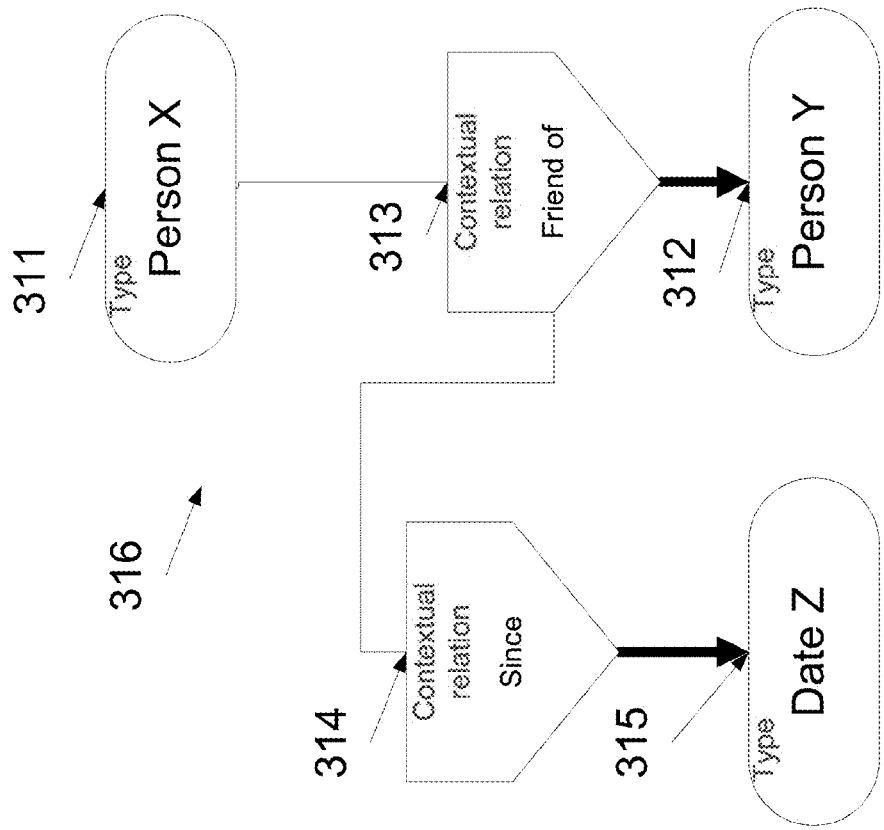

As describe above, a contextual relation may be part of a complex relation among a plurality of instance types that is involving, or depending on a set of contexts. In order to describe such a complex relation, a contextual relation may be connected to one or more additional contextual relations. For example, as shown at FIG. 4, which is a schematic illustration of a contextual relation 313 that connects between two nodes 311, 312 and an additional contextual relation 314 that is connected to an additional node 315. The association between two or more contextual relations allows the generation of a conditional contextual relation that defines a combination of contextual relations. For example, FIG. 4 depicts the conditional contextual relation "person Y that is a friend of person X since date with Z", where X and Y are of a person type nodes and Z is a date type node, as shown at 316. Optionally, using the exemplary query methodology below, such a query may be presented as:

FriendOf/Since^Date=="1/12/08"]^Person where Z=1/12/08. It should be noted that a conditional contextual relation may combine any number of contextual relations. For example, a "person Y that is a friend of person X from W since date Z", where A, Y, and Z are as described above and W is a type node that defines the characteristic "acquaintance circumstances" identifier, such as "from University", "from School", "from work" and the like.

The contextual map, which is optionally a directed graph, is used for representing complex contextual information. As outlined above and described below, such complex contextual information may combine information that is represented in different databases, websites, services, and functions. The contextual relation between the type instances does not have to define in any source of information and therefore the system 100 and the method, which is depicted in FIG. 2, may be used as a tool for obtaining information that is not accessible by via single source of information on the basis of one or more contextual relations.

In some embodiments of the present invention, the system 100 allows the updating of the contextual map 102 and/or the functionality database. In such an embodiment, the system operator, a learning module, and/or any user of the system may update the contextual relations and/or the type nodes which are mapped in the contextual map 102 and the association thereof with functionalities of the functionality database 103. Optionally, the system 100 allows the updating and the addition of functionalities. In such an embodiment, the contextual map 102 may be a dynamic graph in which type nodes may be added to the graph. It should be noted that allowing such an addition may create a graph that contains a number of similar nodes which are identical in values and contextual relations. For clarity, a node or a graph may be merged into the graph of the contextual map 102 either directly, for example using one or more application program interfaces (APIs) from XML or non-XML sources such as relational tables.

Figure 5:
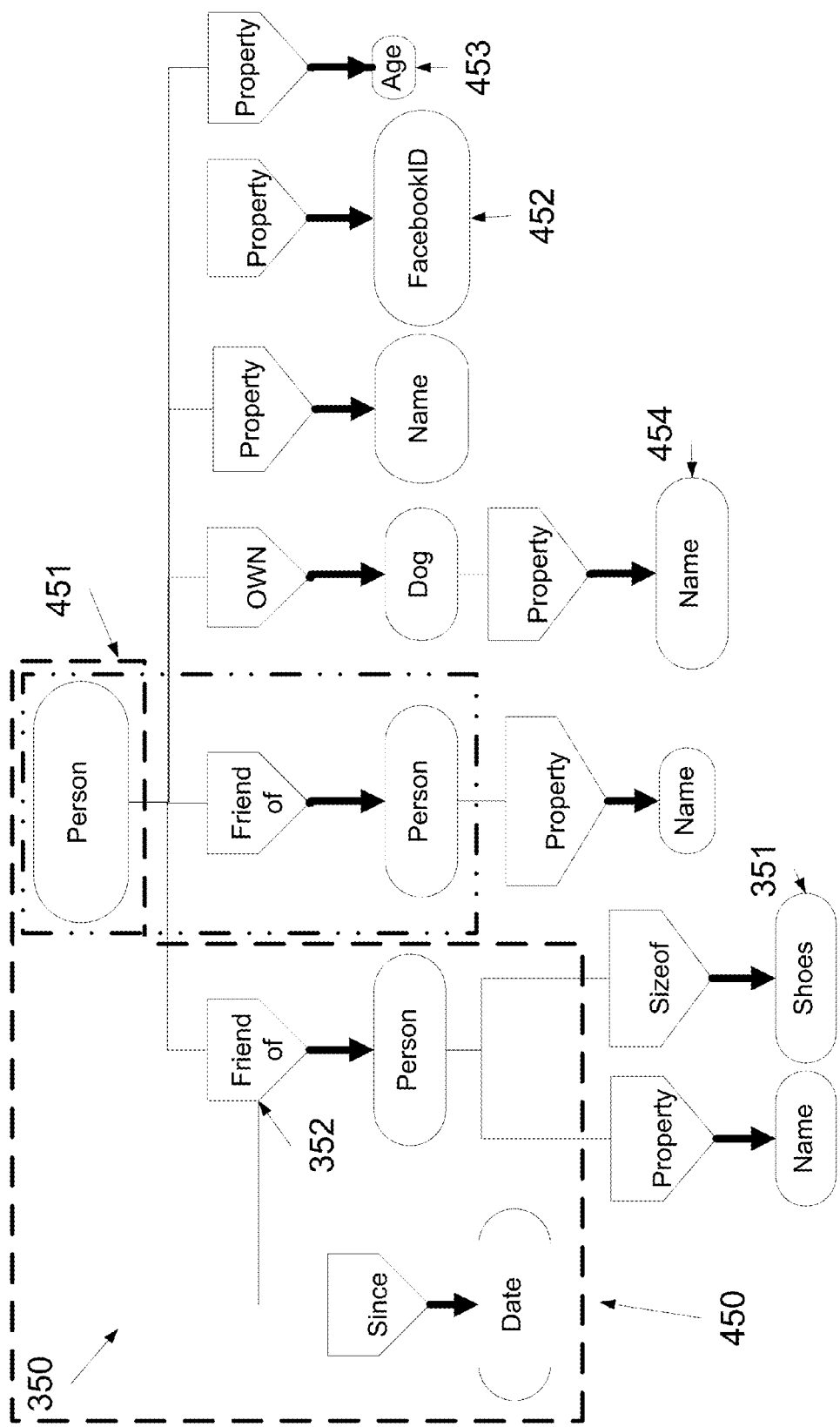

Reference is now made to FIG. 5, which is a schematic illustration of an exemplary contextual map graph 350 depicting contextual relations and type nodes of a contextual map 102 that maps social networks, according to some embodiments of the present invention. As described above, the contextual map 102 maps various contextual relations among node types. Optionally, the contextual map 102 or any segments thereof, for example as shown at 450, 451 maps contextual relations which are related to social network, such as Facebook™, Linkedin™, and Plaxo™. In such an embodiment, the contextual relations create complex relations, as described above, for example by combining common social relations, such as a "Friend of" relation, as shown at 352, with other relations which are not related to social relationships, such as property relations, for example "Size of", as shown at 351, and with node types which are not related to people, such as "Shoe" type, as shown at 352. In such a manner, the contextual map 102 may be used for identifying instances which are contextually related to a known instance via a contextual relation that mix between social relations and other relations, such as property relations. For example, the following conditional contextual relation: "a person Y that is a friend of person X and have shoe size R" may be used identifying results to the query "which one of George Bush friends has shoe size 42" where the known instances "George Bush" of a person type and "42" as a size type and the contextual relation is "Friend of" and it is connected to a contextual relation "Size of".

As described above, each one of the functionalities of the functionality database 103 is optionally connected to sub-graph of the contextual map graph 102. For example, the sub-graph that is shown at 451 is optionally connected to a search module and designed to receive a name of a person and to search the website www.facebook.com for his or her friends and the sub-graph that is shown at 450 is optionally connected to the same search module or to another search module that is designed to receive a name of a person and a date and to search the website www.facebook.com for friends of a person with the received name which are marked as being his friends since the received date.

In use, in order to acquire instances of an instance type that is not directly associated with the type of the received known instance; a number of functionalities may be used. As described above, contextual relations of the contextual map 102 are optionally associated with one or more functionalities. In such an embodiment, one or more functionalities may be used acquiring intermediate instances which are used, together with other functionalities, for acquiring more contextually related instances. Optionally, the process of executing the functionalities is an iterative process. In such an embodiment, an outcome of one of the functionalities is used as an input for another of the functionalities and so on and so forth. As described above, the contextual map 102 may be an ordered graph. Optionally, the functionaries are executed in the order of a segment of the contextual map 102 that describes a contextual linkage between the known instance and the contextually related instances which are defined in the graph.

Exemplary Query Methodology

Reference is now made, once again, to FIGS. 1 and 2. As described above and shown at 104, the system 100 comprises an input module 104 for receiving a query that includes one or more known instances and a request for contextually related instances. Optionally, in order to allow the context engine 105 to search for the requested contextually related instances, a query methodology is defined.

This section defines an exemplary syntax and semantics of a query methodology for the context engine 105. The query methodology allows the user 109 and/or network node, such as an information localization tool, for example a search engine or a mapping application, to query for required and optional instances which are contextually related to other instances which hosted and/or documented in separate, optionally unrelated, databases.

The query methodology may also be used for defining the aforementioned functionality descriptors. The query methodology optionally supports extensible value testing by allowing a user to formulate functionality descriptors which are associated with custom functionalities. Optionally, the query methodology supports resource description framework schema (RDFS) and the basic elements for the description of ontologies, otherwise called resource description framework resource description framework (RDF) vocabularies, see RDF Vocabulary Description Language 1.0, RDF schema world wide web consortium (W3C) recommendation, published on 10 Feb. 2004 and incorporated herein by reference. Such formulated functionality descriptors are optionally added to the functionality database 103.

For clarity, the query methodology includes character tokens and Boolean operators, both sub-sets of the American national standards institute (ANSI) conventions.

Optionally, some or all of the following character tokens are defined:

^—defines a "Targeting to" step in the contextual map;
~—defines a back step in the contextual map;
?—defines single step that expects a list of nodes and/or contextual relations;
/—define a single step that expects a single type node or a single contextual relation; and
[ ]—defines a filter on a type node or a set of type nodes, as further described below.

Optionally, some or all of the following Boolean operators are defined as follows:

>—defines a "bigger than" operator;
<—defines a "smaller than" operator;
<=—defines a "smaller or equal than" operator;
>=—defines a "bigger or equal than" operator;
==—defines an "equality than" operator;
!=—defines a "non equal" operator;
&&—defines an "AND" operator; and
||—defines an "OR" operator.

Figure 6:
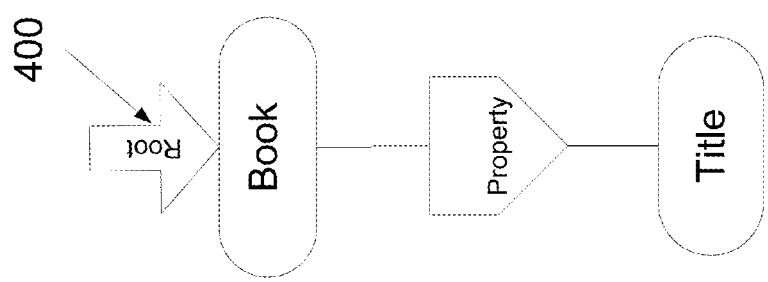

In particular, the query methodology allows the formulating of one-step queries that may be represented as sub-graphs of the contextual map graph. For example, FIG. 6 depicts a sub-graph that is defined according to the following one step query:

/Property^Title where a root arrow 400 denotes a pointer to a specified type node which is used as a point of reference in the contextual map graph. Optionally, the current arrow 400 points toward a type of a known instance. The one step query defines, according to the root arrow 400, "a Book X with a title Y". In use, the context engine optionally matches the graph query with a sub-graph of the context map graph that links between a node type "title" and a node type "Book" and uses an associated functionality that returns an instance of the type "title".

Optionally, the query methodology allows the formulating of one step query for a contextual relation. For example, for the sub-graph that is depicted in FIG. 6, the following one step query is defined:

/Property

Figure 7:
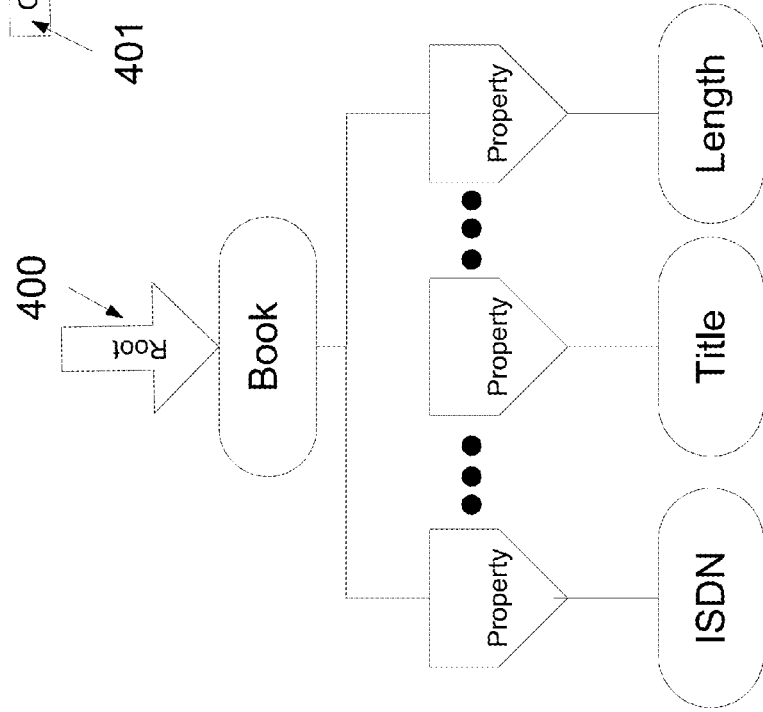

In such an embodiment, the one step query is executed on the contextual map graph when the root arrow 400 points toward the node type "Book". In such a manner, the one step query defines the query "all the properties of a Book X". In use, the context engine matches between the query graph and a sub-graph of the context map graph that includes node types "property" which are linked from a node type that is pointed by the root arrow 400 and associated with a functionality that returns one or more instances of the type "property". For example, in a sub-graph that is defined as depicted in FIG. 7, the results of the one step query "/Property" are instances of an ISDN type, title type, and/or length type. It should be noted that the response to the query may include any other property that is associated with the type which is pointed by the root arrow 400. In use, a number of functionalities may be used to return all the properties which are connected to the pointed type node with the exemplary contextual relation "property", for example a search module that is designed to receive a book title and to search the congress library database for the international standard book number (ISBN) thereof, a search module that is designed to receive a book title and search the website www.amazon.com for the length thereof, etc.

Optionally, the query methodology allows the formulating of multi-step queries that may be represented as sub-graphs of the contextual map graph. In such an embodiment, the context engine 105 optionally divides the query to a number of single step queries and iteratively acquires the results of each single step query until the one or more instances which are requested in the multi-step query are acquired. For example, FIG. 8 shows a query graph that is defined according to the following multi step query:

/FRIENDOF^PERSON/PROPERTY^NAME that is executed when a current arrow 401 points toward the node type "Person" and where two steps are combined into one. In this multi step query, the result includes an instance that includes the name of the person who is a friend of the person that is pointed at by the current arrow 401, and her name is provided as a known instance. Optionally, the multi step query is divided to two steps. The result of the first step, which is an equivalent of the single step query "FriendOf-^Person", is an instance of a "person" type and the result of the second step, which is an equivalent of the single step query "/PROPERTY^NAME" from a pointer to the person type node, is an instance of the "name" type, which is the requested result of the multi step query.

As described above, the multi step query requests for a single instance that is selected according to the requested final type node or the requested contextual relation.

Optionally, the query methodology may be used for defining a multi step query that requests for more than one instance, in various types and/or contextual relations. Optionally, the request for a number of instances is converted to a request for instances that match with type nodes and contextual relations of a segment of the sub-graph that is derived from the query. Optionally, the context engine is designed for generating an answer graph that depicts the contextual relation between the retrieved instances.

For example, FIG. 9 shows a query graph that is defined according to the following multi step query:

/FRIENDOF/SINCE^DATE/~SINCE/~FRIENDOF where the type node "person" is pointed at by the current arrow 401 and ~ defines a back step in the answer graph that is built by the context engine 105. In use, the context engine 105 performs four steps. The first step acquires an instance that is connected to a "Friend of" contextual relation. The second step retrieves an instance that matches a node of a "Date" type that is connected to the "Friend of" contextual relation via a "Know since" contextual relation. The third step is a backward move that instructs the context engine 105 to point toward the "since" contextual relation. The final step is a backward move that instructs the context engine 105 to point toward the "Friend of" contextual relation.

The query methodology allows the formulating of a query for obtaining of a number of instances that match a certain definition, for example using the aforementioned "?" token. The result of such a query is a list with one or more sub-graphs that satisfies the given query. Optionally, the query methodology allows the definition of a query for a certain instance in the list. For example, the query ?FRIEND^PERSON/0 iteratively searches a list that is gathered by the context engine 105 in response to the query ?FRIENDOF^PERSON.

Reference is now made, once again to FIG. 1 and to FIG. 5. Optionally, the context engine receives a query with one or more filters and restricts the provided results accordingly. Optionally, a query includes a filter that restricts the results to type nodes which are contextually related to a property and/or a characteristic with a certain value. For example, the query /FRIENDOF[/SINCE^DATE=="1/1/1994"]^PERSON that is equivalent a query graph that is defined in FIG. 10 and may be matched with a sub-graph of the contextual map 102 of FIG. 5, as shown at 450, triggers the context engine 105 to search for all the friends of person X since 1/1/1994. In use, the context engine 105 optionally uses a functionality that is associated with a contextual relation that is equivalent to the query /FRIENDOF[/SINCE^DATE]^PERSON and filters instances that define friends of person X which are not defined as friends since 1/1/1994 from the results. A filter may also define a range in which a characteristic and/or a property may be bounded. A filter may be used to bound results according to more than one range and/or value.

The context engine 105 may be used for obtaining instances of types which are equivalent to type nodes in a segment of a context map 105. For example, the context engine 105 may be used for identifying a graph pattern with a number of type nodes and/or contextual relations. In such an embodiment, the context engine 105 may be used for obtaining data that is defined in a query that defines a complex relation such as "an actor X that played in a movie Y for more than X minutes", for example as follows: /PLAYEDBY[/FOR^TIME]^ACTOR.

In use, the input module 104 forwards a query that defines a contextual linkage between a known instance and contextually related instances to the context engine 105. The query is optionally formulated according to the aforementioned query methodology. The context engine 105 matches between a query graph that is defined according to the received query and a sub-graph of the contextual map graph. Now, after the sub-graph has been matched, the context engine 105 accesses the functionality database 103 and selects one or more of the functionality descriptors according to the sub-graph.

Reference is now also made to FIG. 11, which is a schematic illustration of a segment 550 of a contextual map graph that defines, inter alia, a set of constrains for executing a certain functionality, according to some embodiments of the present invention. As describe above, the contextual map graph includes contextual relations that connects between various type nodes. Optionally, one or more of the type nodes of the contextual map graph define one of more constrains, which may be referred to herein as conditions, and one or more of the contextual relations thereof define conditional relations. Such condition nodes and conditional contextual relations may be used for defining a certain graph pattern that conditions the ability to use a certain functionality that is associated therewith. As described above, the contextual engine 105 matches between a query for one or more requested instances and a segment of the contextual map 102. In order to acquire the one or more requested instances, the contextual engine 105 uses one or more of the functionalities which are associated with the segment or sub-segments thereof. The condition types and conditional contextual relations may define which intermediate instances are required in order to invoke a functionality that is associated with a sub-segment and/or a segment. Briefly stated, the one or more condition types and conditional contextual relations may define a set of specifications that defines terms for providing instances. Optionally, the condition types and conditional contextual relations are optionally not matched with the received query. In such an embodiment, the condition types and conditional contextual relations are used for defining which functionalities to use.

For example, the "Required" conditional contextual relation 551 assures that the provided current location has a "as^GPSCoordinates" link. In addition, the following "Required" conditional contextual relations 552, 553 assures that the "as^GPSCoordinates" link contains latitude value 554 and longitude value 555.

In addition, the condition type 556 assures that the latitude value 554 and longitude value 555 are in a specific range 557, namely in a specific grid square of the world map.

Optionally, the condition types and/or the conditional contextual relations are weighted. In such an embodiment, a condition node may define a graded condition range and/or a complex condition that depends on the values of a number of instances.

In some embodiments of the present invention, a type node, which is referred to herein as an inheritance relation node, is used to define an inheritance relation among two or more instance types. In such an embodiment, the inheritance relation node defines a derived type node that inherits the instance types and the contextual relations of another type node, which may be referred to herein as a base node. The derived type node may be connected via other contextual relation to other instance types. For example, FIG. 12, which is a schematic illustration of a segment of the contextual map 102, depicts an inheritance relation between an "artist" type node and a "person" type node, according to some embodiments of the present invention. In such an embodiment, whenever an instance that defines an artist is matched with the contextual map 102, as described above, the contextual relations of a type node "person" are checked as if they where the contextual relations of the type node "artist"

A Plurality of Functionalities

Optionally, a number of different functionalities are associated with a certain segment or a sub-segment. In such an embodiment, each one of the functionaries may be weighted according characteristics of the service and/or the data source that is related thereto, for example, a rank, such as the page rank of the data source, the answer retrieval speed, the access cost, a rating which is provided by the operator, and/or a statistics rank which is determined, optionally dynamically, according to the feedbacks which are received by the users and/or the operator, retrieval success rates, and/or usage rates. Optionally, each functionality descriptor in the list is associated with a record that defines the rank thereof.

Data Expending Feature

In some embodiments of the present invention, the context engine 105 is designed for obtaining information that is related to one or more known instances and/or contextual relations. In such an embodiment, the context engine 105 receives a query with one or more instances and contextual relations and matches it with a segment of the contextual map, as described above. The context engine 105 can then use the contextual map to find more instances which are contextually related to the known instances and/or contextual relations. A query for receiving more information that is related to a certain instance and/or contextual relation may be referred to herein as an expand query. For example, the context engine 105 may receive an expand query for the contextual linkage "John Doe, which is a friend of Jane Doe", that may be presented as a segment in the contextual map 102 that is depicted in FIG. 5, as shown at 451. The context engine may use the contextual map 102 for finding all or some of the instances which are contextually related to the received instance, for example the FacebookID of John Doe 452, his age 453, the name of his dog 454, and/or the shoe size of one of his friends, as shown at 351 and described above. Each one of these instances may be acquired using a respective functionality that is associated with respective contextual relations in the contextual map. In use, the context engine uses known instance which have been received via the input module and/or instances that have been provided by other functionalities. For example, a functionality that provides names of friends of a person on the basis of the person's name may be used to provide a name of one or more of the friends. The functionality may require the FacebookID 453 of the person. The context engine may then activate another functionality for obtaining the requested FacebookID 453 from the website www.facebook.com. The context engine 105 may use the names of his friends with other functionalities in order to provide their addresses, job titles, age, and the like.

Optionally, the results which are retrieved to a certain expand query may be limited. Optionally, a depth filter that limits the depth of instance types in the contextual map defines a threshold depth that limits the retrieved instances, for example a 1, 2, 3, 4, 5, 10, 50, 100, 1000 contextual relations. Optionally, a quantity filter that limits the number of instances which are retrieved limits the retrieved instances, for example a 1, 2, 3, 4, 5, 10, 50, 100, 1000 contextually related instances. Optionally, a period filter that limits the period during which instances are retrieved limits process, for example a 1, 2, 3, 4, 5, 10, 50, 100, 1000 seconds.

Exemplary Applications

Reference is now made, once again, to FIG. 1. As described above, the system 100 is designed to receive query that defines a known instance of a first type and a contextual relation thereof with at least one instance of second. As described above, the system 100 may be connected, optionally via the network 101, to one or more network nodes 106, 107, such as a server 106, for example a search engine, a data mining system, a website server, and/or any information localization tool and/or to a client node 107, such as a client module 108, for example a search module or browsing enhancement add-on which is installed on a client terminal 110. In such embodiments, the client module 108 and/or the network node 106 generate or forward queries to the input module 104 and optionally receive the results of the queries therefrom, optionally as further described below.

In some embodiment of the present invention, the client module 108 is a browser extension. The browser extension is designed to enrich webpages with relevant content that is acquired using the system 100, optionally as described above.

Reference is now also made to FIG. 13, which is a schematic illustration a method for enriching a display of a resource of information, such as a webpage or a database record display, according to some embodiments of the present invention. The method, which is described in FIG. 13, is optionally performed by the aforementioned browser extension. First, as shown at 601, a resource of information, such as a webpage, is received. Optionally, the received resource of information is a webpage that is downloaded by a browser, such as a Microsoft Internet Explorer™ (IE), Firefox™ browser, Netscape Communicator™ window, Safari™ and/or a Flash and/or Silverlight™ supporting browser. Then, as shown at 602, the received resource of information is analyzed and one or more objects of interest are identified therein. As used herein, an object of interest means a word, a string, a sentence, a tag, and/or a metadata object.

Optionally, the resource of information is a webpage and the objects of interest are strings in the text and/or the metadata thereof, or the webpage URL. Optionally, the objects of interest are determined by a string analysis module that uses built in dictionaries in local storage and/or caching mechanism and/or word processing techniques such as natural language processing (NLP) techniques, advanced usage of regular expressions techniques, and/or dynamic languages techniques. Optionally, the string analysis module identifies the objects of interest by matching the strings in the text or the metadata of the webpage to a predefined list of strings that is stored in a remote server and defines the objects of interest. Optionally, the identification process, which is performed by the string analysis module, is adjusted according to the resource of information. For example, when the user is viewing a webpage of www.amazon.com that refers to a music album, text and links of the webpage that represent the album name, the artist and the price automatically become objects of interest. Optionally, the user selects one or more objects of interest by using the mouse arrow or any other pointing element or device. Optionally, the instance type of each one of the objects of interest is identified and/or provided in advance.

After the objects of interest are selected, they are forwarded, as instances, to a query generation module, as shown at 603, optionally together with their instance type. The query generation module, which is a part of the client module 108, the system 100 and/or an independent feature that is installed on the network node 106 or on the client terminal 110, generates a query that includes the one or more of the identified objects. Optionally, the query generation module is associated with a list of queries, each defined for instances of a certain type or instances of a certain combination of types. In such a manner, different queries may be associated with different objects. For example, the query may be defined to retrieve information and/or images which are related to a certain movie when the object is identified as a movie title and weather information and/or traffic information when the object is identified as a location.

Optionally, the query generation module generates the query according to additional instances and/or contextual relations which are gathered from the related data source information and/or from a user profile that is associated with the user 109. The additional instances are optionally used, as described above, with relation to the known instances. Optionally, the user profile, which may be stored on the network node 106 or the client terminal 110, includes instances and/or contextual relations that are related to the user, the user definitions, the user characteristics, browsing history, the user browsing patterns, and the like Using such information, for example, user's interest, which can be determined from his browsing history or pattern, provides contextual content which is specifically targeted for the user. Such user may be extracted by identifying particular events, locations, and/or products which is searched and/or browsed for by the user, for example a restaurant and/or a given location that a particular user appreciates. Similarly, interests may be extracted by identifying content within a site that is associated with the user. For example, a user visiting www.MTV.com will get a hint that will point him to page of the band whose album he recently bought.

Optionally, the system which is depicted in FIG. 1 and the method that is depicted in FIG. 2, may be used for providing a personalized recommendation to a browsing user. In such an embodiment, the known instances which are provided with the query are related the profile of the browsing user. In such an embodiment, the query may be defined to retrieve a recommendation that is based on semantic understanding of the interests of the browsing user.

Figure 14:

Reference is now made to FIGS. 14-17, which are screenshots of an exemplary graphical user interface (GUI) 541, which is optionally a part of the aforementioned client module, for example as depicted in numeral 108 of FIG. 1, that is popped of in response to object of interest in various webpages, according to some embodiments of the present invention. In FIG. 14, the GUI 541 has been popped up in response to the browsing of the user to a webpage that provides a review of music albums, such as a webpage of www.amazon.com. In such an embodiment, the aforementioned client module generates or selects a query which has been associated with URL of the visited webpage. The query acquires a recommendation 542 to the music album from a review website, optionally from a website, which is selected according to the user profile that is appreciated by her, information about an event 543, such as a concert, that is related to the producer of the album, optionally in an area which is close to her address, friends that own and/or sell the reviewed product 544, and/or media files which are related to the reviewed product 545. The information is acquired by using the user information in queries which are submitted as described above in relation to FIG. 2.

Figure 15:
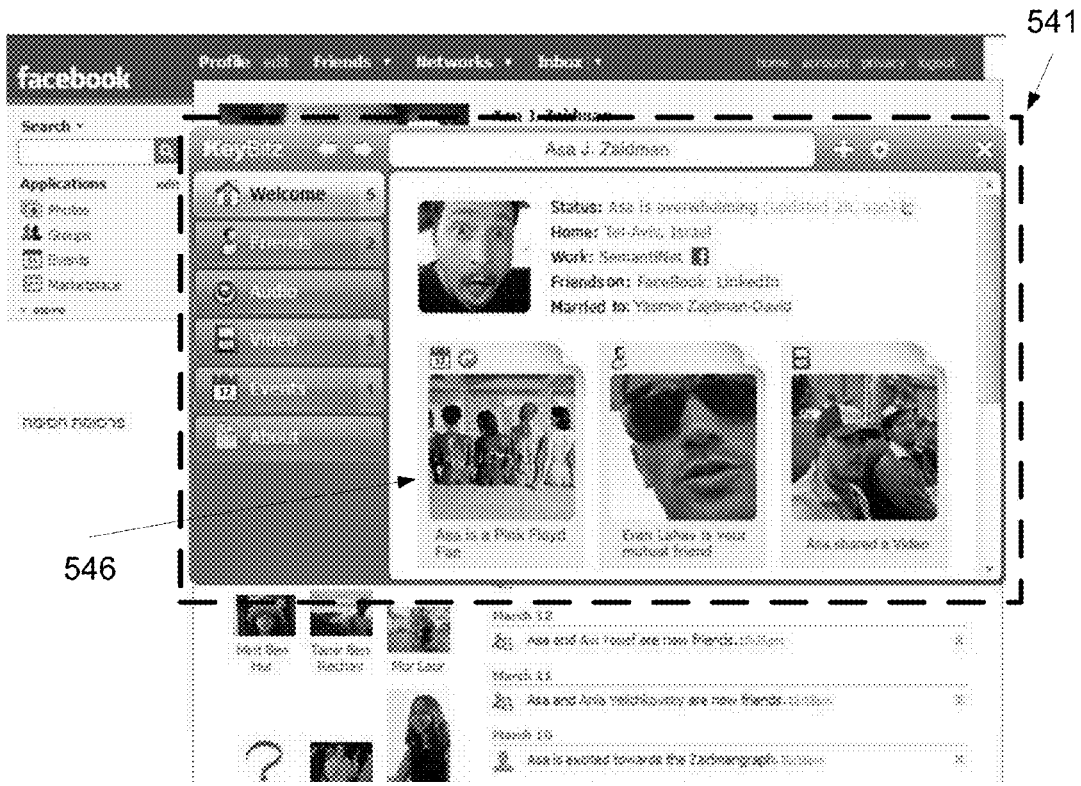
Figure 16:
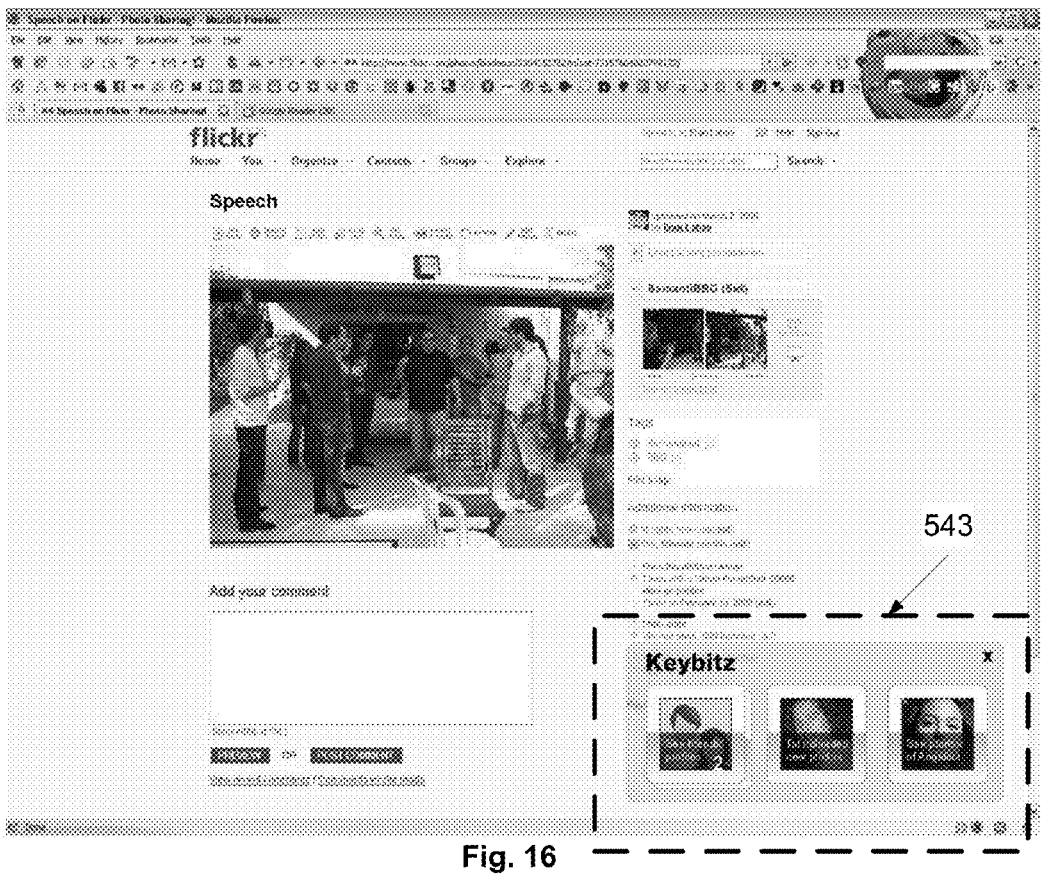
Figure 17:
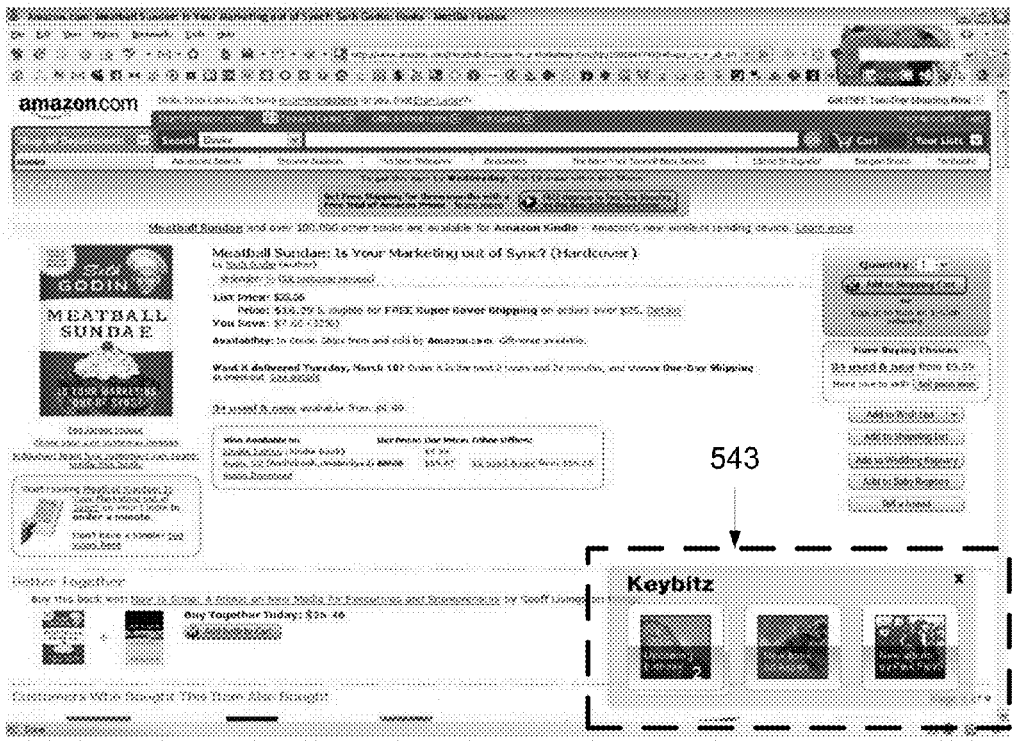

The user profile allows the aforementioned system and/or method to search for information that is related to friends of the browsing user, for example using a contextual map that is based, inter alia, on social network, as depicted in FIG. 15. In such a manner the object of interest, which is the social network webpage and/or the friends name or user ID may be associated with a query for acquiring information about the friend, for example a recommended present to his upcoming birthday 546. The system and/or the method may also be used for notifying the browsing user whether one or more of her friends are members of the website she is currently visit and/or whether one or more of her friends currently browse the same website. Such an embodiment may be implemented in websites such as www.flickr.com. Optionally, the aforementioned system and/or method may notify the browsing user about an involvement and/or an activity of her friends in the visited website, for example whether one of her friends uploaded pictures, as shown at FIG. 16, sells a used product, recommended a certain product and the like. In sells websites the GUI 541 may be presented with information that associates between the products and the user and/or her friends, for example as depicted in FIG. 17.

Optionally, the additional instances and/or contextual relations are determined according to the internet protocol (IP) address of the user. Such information allows the query generation module to add instances or contextual relations which are related to the geographical location of the user and/or to previous information which has been gathered on the user.

Now, after the query is formulated, contextually related instances are acquired according to the query, as shown at 604. Optionally, the query is forwarded to the system 100 and the system 100 that identifies the contextually related instances, optionally as described above. The contextually related instances are optionally forwarded to the client terminal that displays the resource of information. The instances and/or the queries may also be forwarded to a central server for monitoring and/or statistics.

Optionally, the client module 108 includes one or more of the following components:

a user interface (UI) for supporting the adjustment of the client module 108 and/or controlling the functions thereof. Optionally, the UI supports extensive layout, themes and accessibility features;

a dissecting module for identifying the objects of interest in a webpage that has been downloaded by a respective browser, optionally as described above in relation to block 602;

a data access component—interfacing module for supporting the connection of any data source and the adding of semantic tools, software development kits (SDKs) and rich mapping mechanism, such as XML, XML schema definition (XSD), and extensible style-sheet language transformations (XSLT) and various sources; and a context sensitive hosting module—a communication module for interfacing with the system 100.

As described above, the system 100 receive queries, via the network, from a requesting entity, such as the network node 106 and/or the client module 108. It should be noted that the client module 108 and/or the network node 106 may also directly connected to the requesting entity.

Optionally, the requesting entity is a context sensitive logging and auditing tool that is used in order to log the important data in the right context for tracking transactions, security testing, and maintenance operations.

Optionally, the requesting entity is a security module for implementing security business logic, advanced authentication and authorization mechanism, encryption and other data protection mechanism to prevent sensitive information leakage.

Optionally, the requesting entity is profile persistence mechanism which is used for capturing and storing client information. In such an embodiment, the information about each client is stored as a graph in a client database. The graph is optionally created according to the aforementioned methodology. The system 100 is designed to find instances which are contextually related to a certain client by using a contextual map that is based on client information types and related contextual information.

Optionally, the requesting entity is business intelligence mechanism which is connected to a large scale data warehouse that supports ongoing and offline online analytical processing (OLAP). In such an embodiment, the system 100 is designed to find instances which are contextually related to a certain company and/or activity by using a contextual map that is based on business related information types and related contextual information.

It is expected that during the life of a patent maturing from this application many relevant systems and methods will be developed and the scope of the term a node, a map, a database, and a network are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for obtaining contextually related instances using one or more different functionality modules, comprising:
    a) providing to a system comprising at least one server a plurality of different functionality modules and a graph mapping a plurality of contextual relations among a plurality of instance types, each said functionality module being associated with at least one of said plurality of contextual relations in said graph and configured for providing at least one instance of a respective type;
    b) receiving a query defining contextual linkage between at least one known instance and at least one requested instance from a client connected to said system via a network, said at least one known instance is not directly associated with a type of said requested instance;

c) identifying, by said system, a match between said contextual linkage and a sub-graph of said graph, said sub-graph being associated with a group of said plurality of functionality modules; and d) dividing said query to a number of single step queries;

e) iteratively executing at least some of said number of single step queries by said system, wherein one of said number of single step queries includes a first member of said group with said at least one known instance for obtaining at least one intermediate instance and another of said number of single step queries includes a second member of said group with said at least one intermediate instance for obtaining said at least one requested instance;

f) responding to said received query with said obtained at least one requested Instance;

wherein said functionality module implements at least one of a web service and a code script;

wherein members of said group are executed in an order matching dependencies in said sub graph.

2. The method of claim 1, wherein said receiving comprises receiving a search query comprising said contextual linkage.

3. The method of claim 1, further comprises converting said contextual linkage to an additional graph before said matching.

4. The method of claim 3, wherein said sub-graph is an ordered graph comprising a plurality of sub-graphs, said obtaining comprises executing each member of said group according to the order in said ordered graph.

5. The method of claim 1, wherein said at least one known instance appears in a document, further comprising selecting said contextual linkage according to at least on member selected from a group consisting of: said document, a profile of a user accessing said document and a browsing history related to said document.

6. The method of claim 5, wherein said document is selected from a group consisting of a webpage, a website, a database record, a screen display.

7. The method of claim 1, wherein each said contextual relation describes at least one of a social relation, a characterizing relation, an ownership relation, a property relation, and an identifying relation.

8. The method of claim 1, wherein at least one of said plurality of contextual relations defines at least one constrain, said executing comprises verifying said at least one known instance comply with said constrain.

9. The method of claim 1, wherein said contextual linkage comprises a group of said plurality of contextual relations.

10. The method of claim 9, said obtaining comprises executing a first of said group for obtaining at least one intermediate instance and executing said at least one intermediate instance along a second of said group for obtaining said at least one requested instance.

11. The method of claim 10, further comprising outputting an answer graph depicting a contextual relationship of at least one of said at least one intermediate instance and said at least one requested instance.

12. The method of claim 1, wherein at least one of said plurality of contextual relations is a conditional contextual relation defining at least one required instance.

13. The method of claim 12, wherein at least one of said plurality of functionality modules is configured for using said at least one required instance for obtaining said at least one requested instance.

14. The method of claim 12, wherein at least one of said plurality of contextual relations defines an inherence relation between one of said plurality of instance types to another of said plurality of instance types.

15. The method of claim 1, wherein said obtaining comprises using at least one of said plurality of functionality modules for providing a member selected from a group consisting of an advertisement, a rich site summary (RSS), a media file, a link to a contextually related content, and a website; wherein said member is contextually related to said at least one known instance.

16. The method of claim 1, wherein at least one of said plurality of functionality modules is a search module configured for searching at least one instance of an associated said instance type in at least one database.

17. The method of claim 1, wherein at least one of said plurality of functionality modules is a conversion module configured for converting at least one instance of an associated said instance type.

18. The method of claim 1, wherein said a web service is selected from a group consisting of: a representational state transfer (REST) module, a symbolic optimal assembly program (SOAP) module, and a module executing a database query.

19. The method of claim 1, wherein said a code script is selected from a group consisting of: a sub-graph in a transformation language that includes a set of instructions for processing a related data, an extensible style sheet language transformations (XSLT), a set of text transformations, a set of regular expressions, a script in a Python language, a script in a Roby language, a script in a JavaScript language, and a precompiled executable script.

20. A system for identifying a contextually related instance, comprising:

a graph for mapping a plurality of contextual relations among a plurality of instance types;

a list of a plurality of functionality modules, each said functionality module being associated with at least one of said plurality of contextual relations;

an input module configured for receiving from a client connected to the system via a network a query defining a contextual linkage between at least one known instance and at least one requested instance in said graph; and a processor which selects a group of said plurality of functionality modules according to a match between said contextual linkage and a sub-graph of said graph, divides said received query to a number of single step queries, and iteratively executes at least some of said number of single step queries for obtaining said at least one requested instance, wherein one of said number of single step queries includes a first member of said group with said at least one known instance for obtaining at least one intermediate instance and another of said number of single step queries includes a second member of said group with said at least one intermediate instance said at least one requested instance;

wherein said functionality module implements at least one of a web service and a code script;

wherein members of said group are executed in an order matching dependencies in said sub graph.

21. The system of claim 20, wherein at least one of said plurality of functionality modules is configured for communicating with a network node for said obtaining.

22. The system of claim 21, wherein said network node is selected from a group consisting of a database, a list, and a web server.

23. The system of claim 20, wherein at least one of said plurality of functionality modules is configured for generating said at least one requested instance according to said at least one known instance.

24. A method for obtaining a plurality of contextually related instances, comprising:
performing the following by a system which comprises at least one server:
identifying at least one object of interest of a first instance type in a data resource;
providing a query defining a contextual linkage between said first instance type and a second instance type;
identifying a match between said contextual linkage and a sub-graph of a graph comprising a plurality of contextual relations among a plurality of instance types;
selecting a group of a plurality of functionality modules, each said functionality module being configured for providing at least one instance of one of said plurality of instance types;
dividing said received query to a number of single step queries;
and
iteratively executing at least some of said number of single step queries,
wherein one of said number of single step queries includes
a first member of said group and used for acquiring at least one intermediate instance
wherein another of said number of single step queries includes
a second member of said group with said at least one intermediate instance and used for acquiring at least one instance of said second instance type;
wherein each of said plurality of functionality modules implements at least one of a web service and a code script;
wherein members of said group are executed in an order matching dependencies in said sub graph.

25. The method of claim 24, wherein said data resource is selected from a group consisting of a webpage, a screenshot, a word processor document, and a graphic user interface.

26. The method of claim 24, wherein said object of interest is selected from a group consisting of a word, a parse, a paragraph, a website, a link, a media file, and metadata element.

27. The method of claim 24, wherein said data resource is accessed by a browsing user, said formulating is performed according to a user profile of said browsing user.

28. The method of claim 24, wherein said providing comprises selecting said contextual linkage according to said object of interest.

29. The method of claim 28, wherein said data resource is a website, said providing comprises selecting said contextual linkage according to at least one characteristic of said website.

30. The method of claim 24, wherein said providing comprises providing a profile of a user accessing said data resource and defining said contextual linkage according to said profile.

31. The method of claim 24, wherein said data resource is a website, further comprising enhancing a display of said website with said at least one acquired instance.

32. The method of claim 31, wherein said at least one acquired instance are displayed in association with said at least one object of interest.

* * * * *